(12) United States Patent
Schade

(10) Patent No.: US 8,356,795 B2
(45) Date of Patent: Jan. 22, 2013

(54) SHAFT RETAINING ASSEMBLIES FOR USE WITH FLUID VALVES

(75) Inventor: Ross Arthur Schade, Ames, IA (US)

(73) Assignee: Fisher Controls International LLC, Marshalltown, IA (US)

(*) Notice: Subject to any disclaimer, the term of this patent is extended or adjusted under 35 U.S.C. 154(b) by 724 days.

(21) Appl. No.: 12/498,822

(22) Filed: Jul. 7, 2009

(65) Prior Publication Data
US 2011/0006234 A1    Jan. 13, 2011

(51) Int. Cl.
*F16K 31/44* (2006.01)
(52) U.S. Cl. .................................. 251/214; 251/305
(58) Field of Classification Search ............... 251/214, 251/305
See application file for complete search history.

(56) References Cited

U.S. PATENT DOCUMENTS

| | | | | |
|---|---|---|---|---|
| 1,484,350 | A | * | 2/1924 | Cusick ................. 251/249.5 |
| 1,538,912 | A | * | 5/1925 | Taylor .................... 251/217 |
| 3,079,034 | A | * | 2/1963 | Eckert, Jr. .............. 220/237 |
| 3,503,415 | A |   | 3/1970 | De Angelis et al. |
| 3,912,221 | A | * | 10/1975 | Fenster et al. ............ 251/214 |
| 4,223,868 | A | * | 9/1980 | Humes et al. ............. 251/326 |
| 4,307,745 | A | * | 12/1981 | McGee ..................... 137/72 |
| 4,524,946 | A | * | 6/1985 | Thompson .................. 251/88 |
| 4,556,076 | A | * | 12/1985 | Bridges ..................... 137/72 |
| 5,152,501 | A | * | 10/1992 | Raymond, Jr. ............. 251/305 |
| 5,370,148 | A |   | 12/1994 | Shafer |
| 7,093,819 | B1 |   | 8/2006 | Hall et al. |

OTHER PUBLICATIONS

Patent Cooperation Treaty, "International Search Report," issued by the International Searching Authority in connection with related PCT application No. PCT/US2010/035137, mailed Sep. 23, 2010 (4 pages).
Patent Cooperation Treaty, "Written Opinion of the International Searching Authority," issued by the International Searching Authority in connection with related PCT application No. PCT/US2010/035137, mailed Sep. 23, 2010 (6 pages).

* cited by examiner

*Primary Examiner* — Craig Schneider
*Assistant Examiner* — R. K. Arundale
(74) *Attorney, Agent, or Firm* — Hanley, Flight & Zimmerman, LLC

(57) ABSTRACT

Shaft retaining assemblies for use with fluid valves are described. In a described example, a bonnet assembly for use with a fluid valve includes a bonnet defining a passage to receive at least a portion of a shaft of the fluid valve. The bonnet is to be removably coupled to the fluid valve. Additionally, the example bonnet assembly includes a retaining assembly mounted in the bonnet to be substantially not exposed to a flow of fluid through the fluid valve. The retaining assembly is to control an amount of movement of the shaft along a longitudinal axis of the shaft to enable an alignment of a sealing element coupled to an end of the shaft relative to a seating surface of the fluid valve.

19 Claims, 10 Drawing Sheets

FIGS. 9-11 depict example bonnet assemblies having alternative example retaining assemblies.

SHAFT RETAINING ASSEMBLIES FOR USE WITH FLUID VALVES

FIELD OF THE DISCLOSURE

This patent relates generally to fluid valves, and, more particularly, to shaft retaining assemblies for use with fluid valves.

BACKGROUND

Process control plants or systems often employ rotary valves, such as ball valves, butterfly valves, eccentric-disk valves, eccentric-plug valves, etc., to control the flow of process fluids. Rotary valves typically include a fluid control element (e.g., a disk, a ball, etc.) disposed in the fluid path and rotatably coupled to the body of the valve via a shaft. To control the flow of fluid through some rotary valves, the position of the fluid control element may be varied from a closed position at which the fluid control element is in sealing engagement with a seal that surrounds a flow aperture to a fully open or maximum flow rate position at which the fluid control element is spaced away from the seal.

To enable the fluid control element to properly align with the seal, some rotary valves are provided with opposing sleeves that respectively abut an upper drive hub and a lower drive hub of the fluid control element. Additionally, to enable the fluid control element to properly align with the seal, some rotary valves include a shaft that extends through both the upper and lower drive hubs of the fluid control element into the fluid path and through the respective sleeves. While such an approach may enable alignment of the fluid control element relative to the seal, in sanitary applications, the numerous components and abutments within the fluid path associated with this approach tend to cause particulate and/or bacteria accumulation and/or growth on and/or adjacent to these components.

SUMMARY

A bonnet assembly for use with a fluid valve includes a bonnet defining a passage to receive at least a portion of a shaft of the fluid valve. The bonnet is to be removably coupled to the fluid valve. Additionally, the example bonnet assembly includes a retaining assembly mounted in the bonnet to be substantially not exposed to a flow of fluid through the fluid valve. The retaining assembly is to control an amount of movement of the shaft along a longitudinal axis of the shaft to enable an alignment of a sealing element coupled to an end of the shaft relative to a seating surface of the fluid valve.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example shaft retaining assemblies described herein reduce the number of components and/or abutments within flow apertures of fluid valves, thereby reducing the possibility that particulate and/or bacteria will accumulate and/or grow within fluid valves used in, for example, sanitary process applications. Specifically, the examples described herein relate to rotary valves that are provided with retaining assemblies positioned outside of the fluid path of the fluid valves while still enabling proper alignment of a sealing element relative to a seating surface.

The example rotary valves described herein include a sealing element having a shaft that extends through a passage of a bonnet coupled to a valve body. To control longitudinal movement of the shaft and, thus, the position or alignment of the sealing element relative to a seating surface of the fluid valve, an end of the shaft defines a groove around which a plurality of ring segments are positioned. The ring segments may extend from the groove and are captured between opposing surfaces of the bonnet and a cap partially positioned within a cavity defined by the bonnet. In operation, the interaction between the groove of the shaft, the ring segments and the opposing surfaces of the bonnet holds the shaft and the sealing element to maintain alignment of the sealing element relative to the seating surface as well as to provide the fluid valve with redundant blowout protection.

Figure 1:
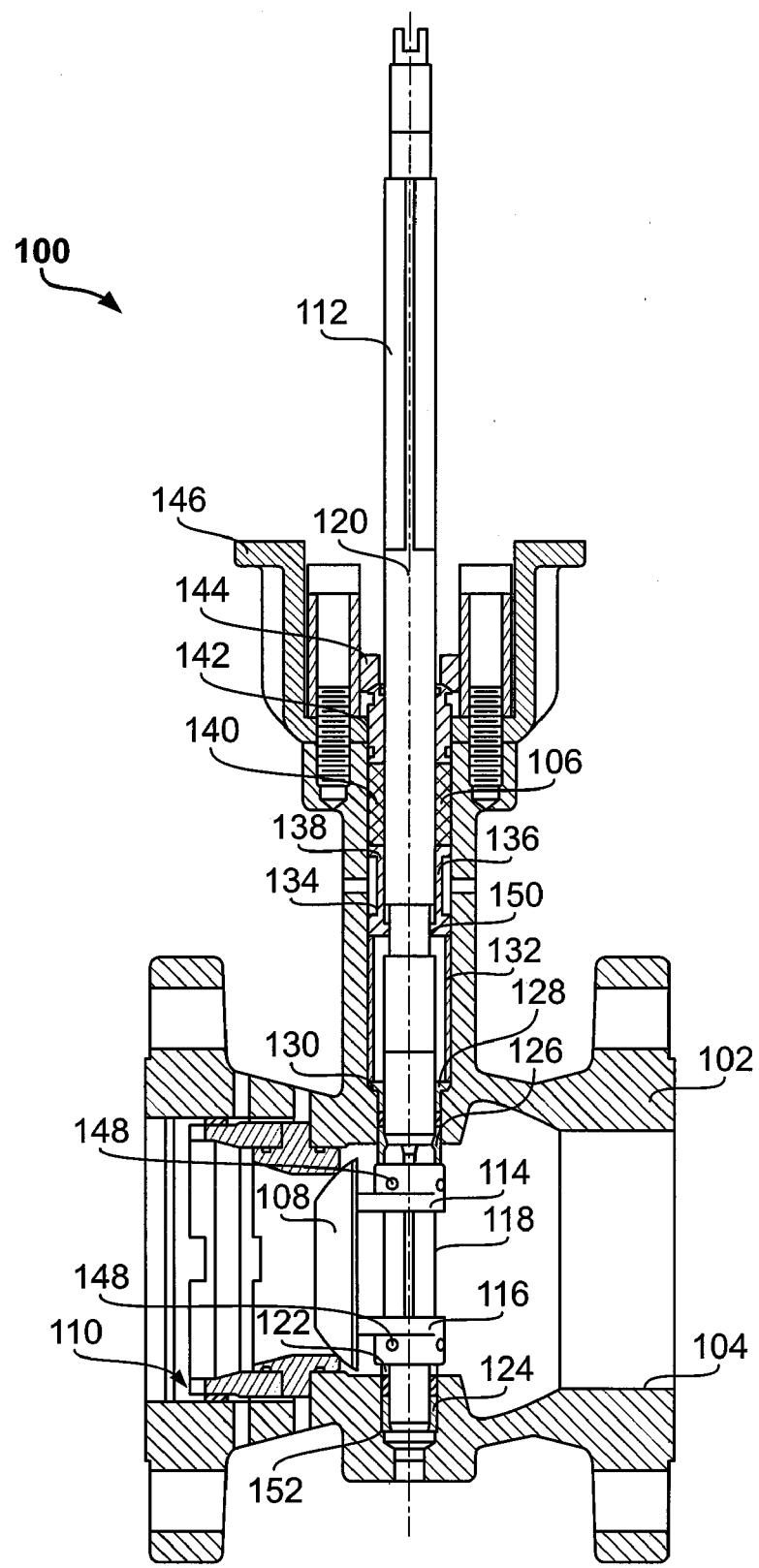
FIG. 1 depicts a known rotary valve.

FIG. 1 depicts a known rotary sanitary valve 100 that includes a body 102 that defines an aperture 104 and a bore 106. A fluid control element or fluid flow control member (e.g., a disc) 108 is at least partially positioned within the aperture 104 to engage a seal assembly 110. The fluid control element 108 is coupled to a shaft 112 via an interaction between upper and lower drive hubs 114 and 116 through which the shaft 112 extends. Specifically, the drive hubs 114 and 116 each define an aperture (not shown) having a substantially square profile and, similarly, a portion 118 of the shaft 112 has a square profile that corresponds to the apertures. To maintain a position of the fluid control element 108 along an axis 120 of the rotary sanitary valve 100, the lower drive hub 116 of the fluid control element 108 engages and/or abuts a lower sleeve 122 positioned around the shaft 112 between a lower bearing 124 and the lower drive hub 116. Additionally, to maintain the position of the fluid control element 108 along the axis 120, the upper drive hub 114 of the fluid control element 108 engages and/or abuts an upper sleeve 126 positioned around the shaft 112 between an upper bearing 128 and the upper drive hub 114. The position of the fluid control element 108 may be maintained by the interaction between the lower sleeve 122, the lower drive hub 116, the lower bearing 124, the upper sleeve 126, the upper drive hub 114, the upper bearing 128, a shoulder 130 defined by the body 102, a spacer sleeve 132, a redundant blowout protection member 134 that includes two interlocking portions 136 and 138, a valve packing 140 and a packing follower 142, all of which are secured in the bore 106 by a portion 144 of a cap 146 coupled to the body 102.

In operation, the rate of fluid flow through the rotary sanitary valve 100 is controlled by the position of the fluid control element 108 relative to the seal assembly 110. The position of the fluid control element 108 may be varied from a closed position or condition at which the fluid control element 108 is in sealing engagement with the seal assembly 110 to a fully open or maximum flow rate position at which the fluid control element 108 is spaced away from the seal assembly 110 and/or substantially parallel to the flow of fluid through the aperture 104.

In the known rotary sanitary valve 100 of FIG. 1, the abutments or surfaces between the sleeves 122 and 126, the shaft 112 and the drive hubs 114 and 116 are at least partially exposed to the fluid flow path through the aperture 104. As a result, particulate and/or bacteria may have a tendency to accumulate and/or grow on and/or adjacent to these surfaces and/or components. To enable fluid to flush through the sleeves 122 and 126 and the drive hubs 114 to reduce the amount of particulate and/or bacteria build up, these components are provided with apertures, some of which are indicated by reference number 148. However, such an approach may inadequately remove the particulate and/or bacteria. Thus, to remove any accumulated particulate and/or bacteria, the rotary sanitary valve 100 is typically cleaned in place with hot water or any other suitable substance (e.g., hot caustic solution).

To assemble the rotary sanitary valve 100, the interlocking portions 136 and 138 of the redundant blowout protection member 134 are positioned about the shaft 112 adjacent a groove 150 and coupled together. The bearings 124 and 128, the sleeves 122 and 126 and the spacer sleeve 132 may then be positioned in or adjacent to a recess 152 and the bore 106, respectively. The fluid control element 108 may then be positioned in the aperture 104 such that the apertures through the drive hubs 114 and 116 are substantially aligned with the recess 152 and the bore 106. The shaft 112 including the redundant blowout protection member 134 may then be guided through the bore 106, the apertures of the drive hubs 114 and 116 and into the recess 152. The valve packing 140 and then the packing follower 142 may be positioned about the shaft 112 and the cap 146 may be coupled to the body 102 such that the portion 144 secures the sleeves 122 and 126, the bearings 124 and 128, the spacer sleeve 132, the redundant blowout protection member 134 and the valve packing 140 at least partially within or adjacent to the recess 152 or the bore 106 via the packing follower 142.

Figure 2:
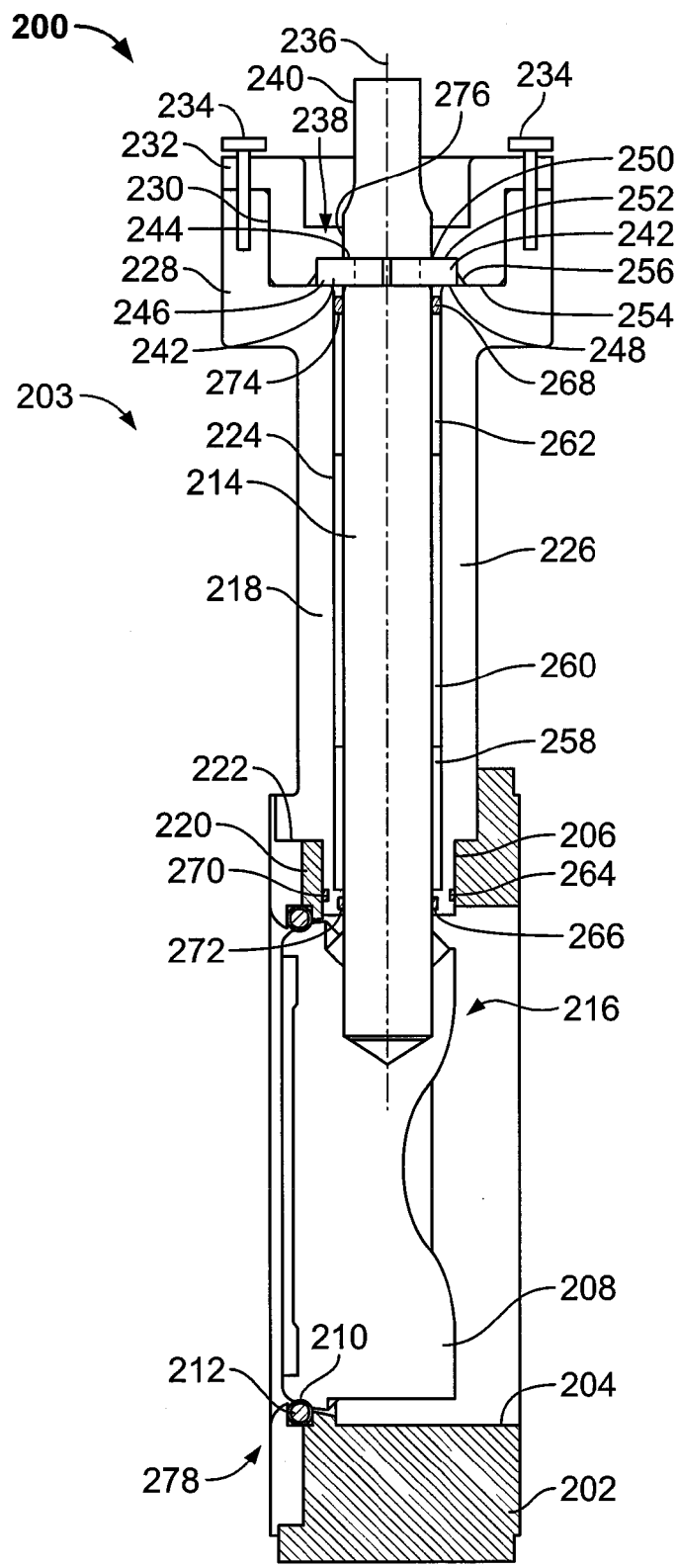
FIG. 2 depicts an example rotary valve including an example retaining assembly.

FIG. 2 depicts an example fluid valve, a rotary valve or a rotary sanitary valve 200 including a valve body 202 and a bonnet assembly 203. The valve body 202 defines a flow aperture 204 and an opening 206. A sealing member, sealing element or flow control member (e.g., a disc) 208 is positioned at least partially within the flow aperture 204 and has a seat 210 to engage a seal or seating surface 212 (e.g., a compliant seal and/or flexible seal) that surrounds the flow aperture 204. In contrast to the fluid control element 108 of FIG. 1 in which the shaft 112 (FIG. 1) extends through upper and lower drive hubs 114 and 116 (FIG. 1) that abut and/or are positioned adjacent to the sleeves 122 and 126, the rotary valve 200 of FIG. 2 includes a shaft 214 that extends from or which is coupled to only an upper portion 216 of the sealing element 208. Thus, the sealing element 208 is cantilevered via an end of the shaft 214. The shaft 214 may be coupled to the sealing element 208 via any suitable method such as welding. In some examples, the coupling (e.g., a weld bead) between the shaft 214 and the sealing element 208 may be sanded or ground to remove any edge(s) and/or surface(s) on which particulate and/or bacteria may accumulate or grow and/or to ensure a substantially smooth transition between the shaft 214 and the sealing element 208.

An example bonnet or support body 218 may be removably coupled to the valve body 202 via fasteners (not shown). To maintain the position of the bonnet 218 relative to the valve body 202, the valve body 202 includes a step or shoulder 220 configured to be engaged by a corresponding surface 222 of the bonnet 218. The bonnet 218 defines a passage or bore 224 that receives the shaft 214, which can rotate within the passage 224. Additionally, the bonnet 218 includes an elongated portion 226 and a collar 228 that defines a cavity 230 that receives at least a portion of a cap 232. In this example, the cap 232 is removably coupled to the collar 228 via fasteners 234.

Figure 4:
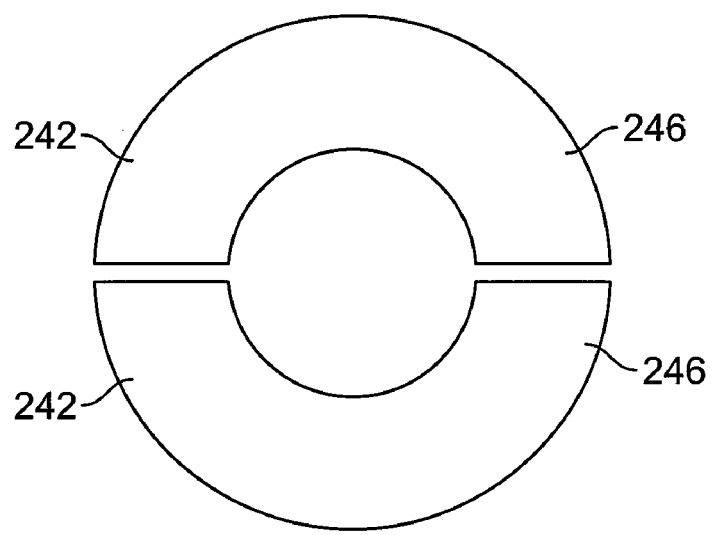
FIGS. 4 and 5 depict an example retainer that may be used to implement the example retaining assembly of FIG. 2.
Figure 5:
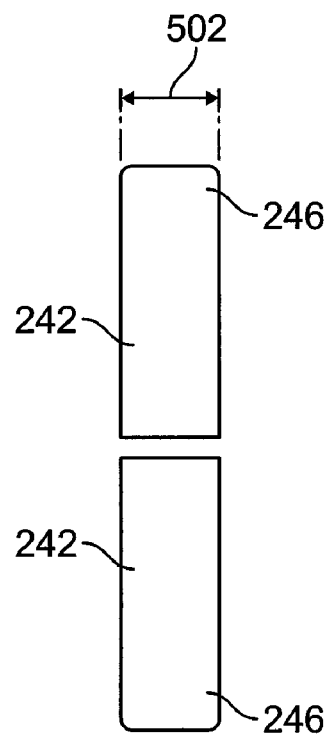
Figure 6:
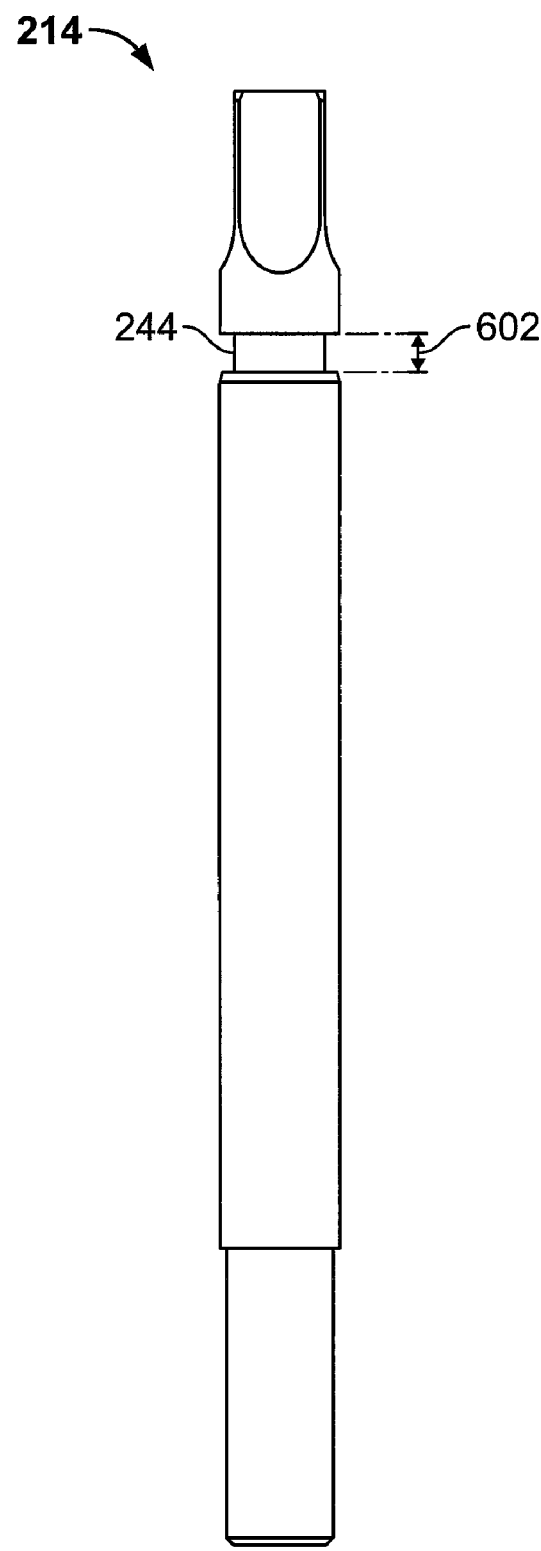
FIG. 6 depicts an example shaft that may be used to implement the example retaining assembly of FIG. 2.
Figure 7:
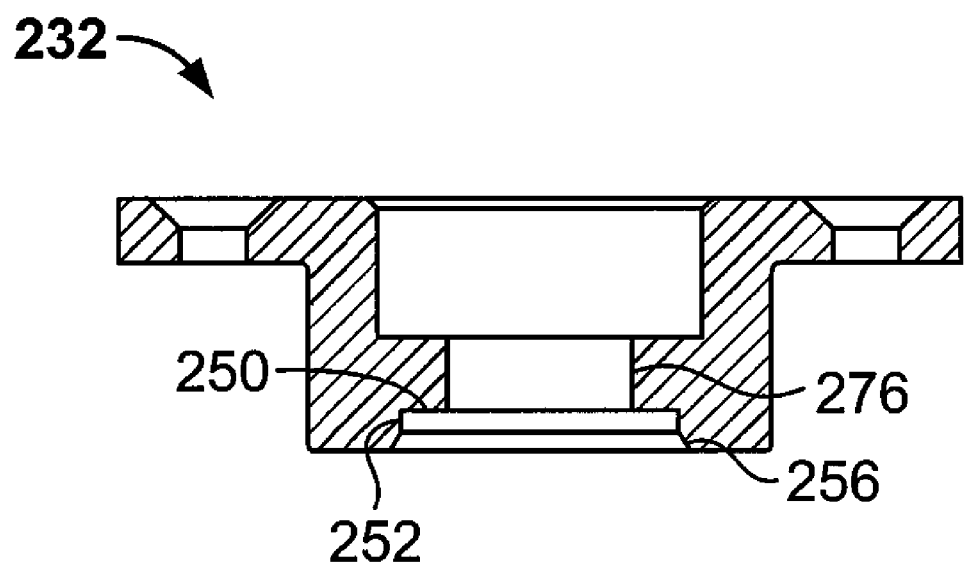
FIG. 7 depicts an example collar that may be used to implement the example retaining assembly of FIG. 2.

To control an amount of movement of the shaft 214 and/or the sealing element 208 along a longitudinal axis 236 and/or to provide the example rotary valve 200 with redundant blowout protection, the example bonnet assembly 203 includes a retaining assembly or shaft retainer 238. As depicted in FIG. 2, the retaining assembly 238 is substantially not exposed to fluid flow through the flow aperture 204 and may be mounted substantially in the bonnet 218. In this example, the retaining assembly 238 is proximate an end 240 of the shaft 214 and includes a retainer or a plurality of ring segments 242 (e.g., split rings, snap rings) (shown most clearly in FIGS. 4 and 5) that may be substantially symmetrical relative to each other and which may be made of a relatively low friction bearing material such as, for example, a polyphenylene sulfide material, a polyaryletheretherketone material, etc. The retainer 242 may at least partially surround and be positioned in a groove 244 (shown most clearly in FIG. 6) defined by the shaft 214. In some examples, a thickness 602 (FIG. 6) of the groove 244 may be relatively larger than a thickness 502 (FIG. 5) of the retainer 242, thereby enabling the retainer 242 to be relatively easily positioned about the groove 244 and/or to compensate for manufacturing tolerances. A portion 246 of the retainer 242 extends from the groove 244 and is captured between opposing surfaces 248 and 250 of the bonnet 218 and the cap 232 (shown most clearly in FIG. 7) such that the retainer 242 is substantially captured in the bonnet 218.

Generally, the interaction between the groove 244, the retainer 242 and the opposing surfaces 248 and 250 holds the shaft 214 and the sealing element 208 to enable alignment of the sealing element 208 relative to the valve body 202 and the seating surface 212. More specifically, the interaction between the groove 244, the retainer 242 and the opposing surfaces 248 and 250 controls the amount of movement of the shaft 214 along the longitudinal axis 236 to enable an alignment of the sealing element 208 relative to the seating surface 212. The cap 232 defines a groove 252 in which the portion 246 of the retainer 242 is at least partially positioned and the collar 228 includes a shoulder 254 engaged by the portion 246. In some examples, a tapered surface 256 may substantially surround the groove 252 to enable alignment of the retainer 242 relative to the groove 252 during assembly.

Figure 8:
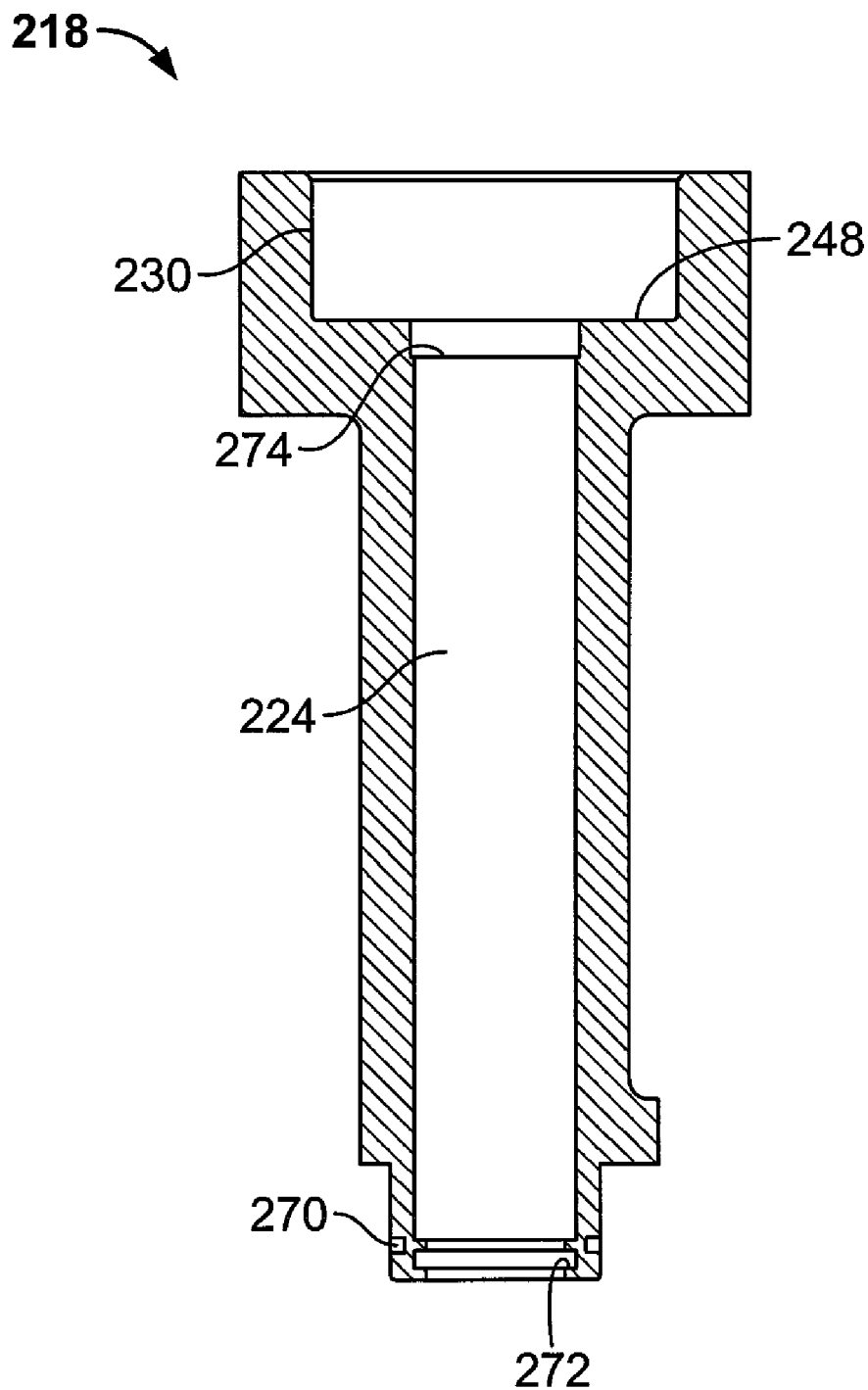
FIG. 8 depicts an example bonnet that may be used to implement the example rotary valve of FIG. 2.

To assemble the rotary valve 200, the shaft 214 may be coupled to the sealing element 208 via, for example, welding. The end 240 of the shaft 214 may then be guided through the opening 206 defined by the valve body 202. A first bearing 258, a spacer sleeve 260 and a second bearing 262 may then be positioned in the passage 224 of the bonnet 218 to laterally support the shaft 214. Next, seals (e.g., o-rings) 264, 266 and 268 may be positioned in respective grooves 270, 272 and 274 (shown most clearly in FIG. 8) defined by the bonnet 218.

The passage 224 of the bonnet 218 may then be positioned about the shaft 214 such that the corresponding surface 222 of the bonnet 218 engages the shoulder 220 of the valve body 202 and the end 240 of the shaft 214 extends from the collar 228. The bonnet 218 may then be coupled to the valve body 202 via the fasteners and the retainer 242 may be positioned about the groove 244 of the shaft 214. An aperture 276 of the cap 232 surrounding the groove 252 may then be positioned about the shaft 214 and the cap 232 may be moved within the cavity 230 toward the retainer 242. The retainer 242 may self-align within the groove 252 because of the tapered surface 256 surrounding the groove 252. Once the cap 232 is positioned relative to the collar 228, the cap 232 may be coupled to the collar 228 via the fasteners 234. A seal retainer 278 may be coupled to the valve body 202 via, for example, fasteners (not shown) to secure and/or position the seating surface 212 relative to the sealing element 208.

Figure 3:
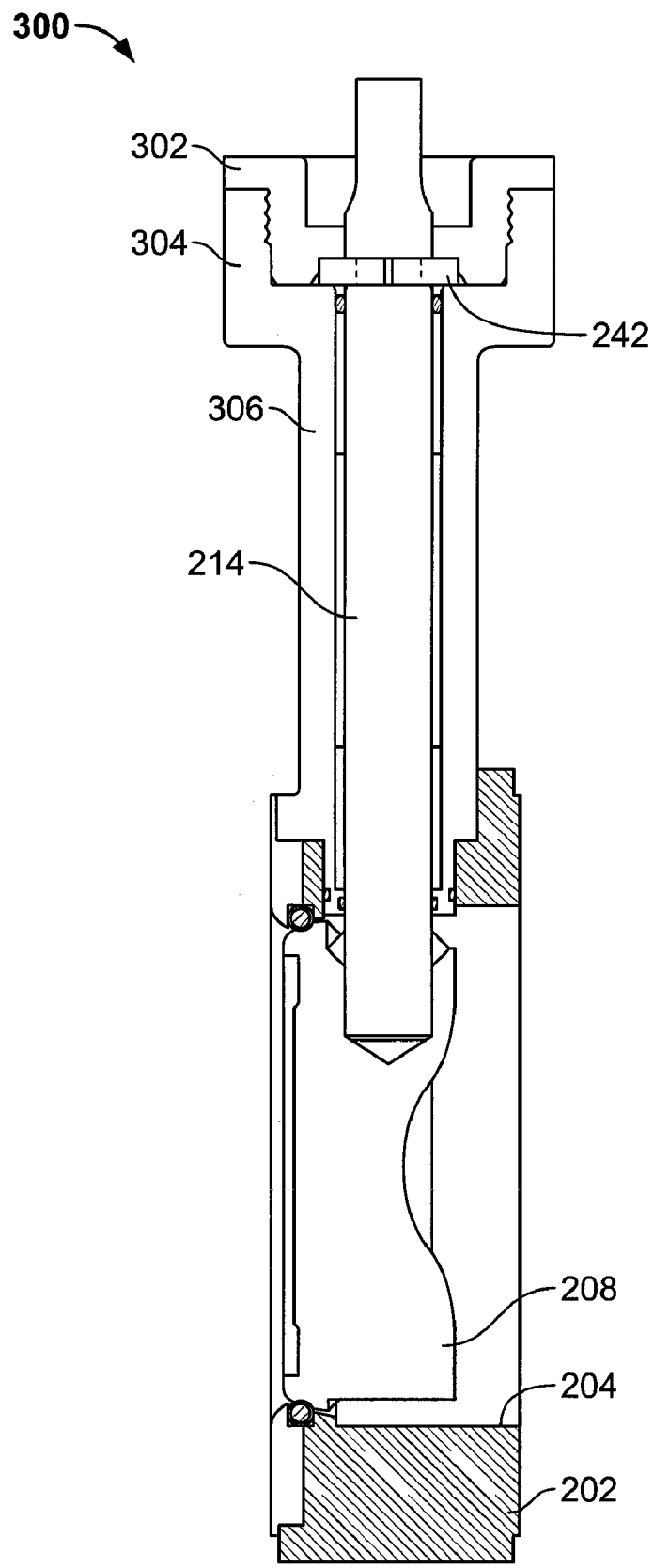
FIG. 3 depicts another example rotary valve similar to the example rotary valve of FIG. 2.

FIG. 3 depicts an example fluid valve, a rotary valve or a rotary sanitary valve 300 that is similar to the rotary valve 200 of FIG. 2. However, in contrast to the rotary valve 200, the rotary valve 300 of FIG. 3 includes a cap 302 that threadingly engages a collar 304 of a bonnet 306 instead of being coupled to the collar 228 (FIG. 2) via the fasteners 234 (FIG. 2).

Figure 9:
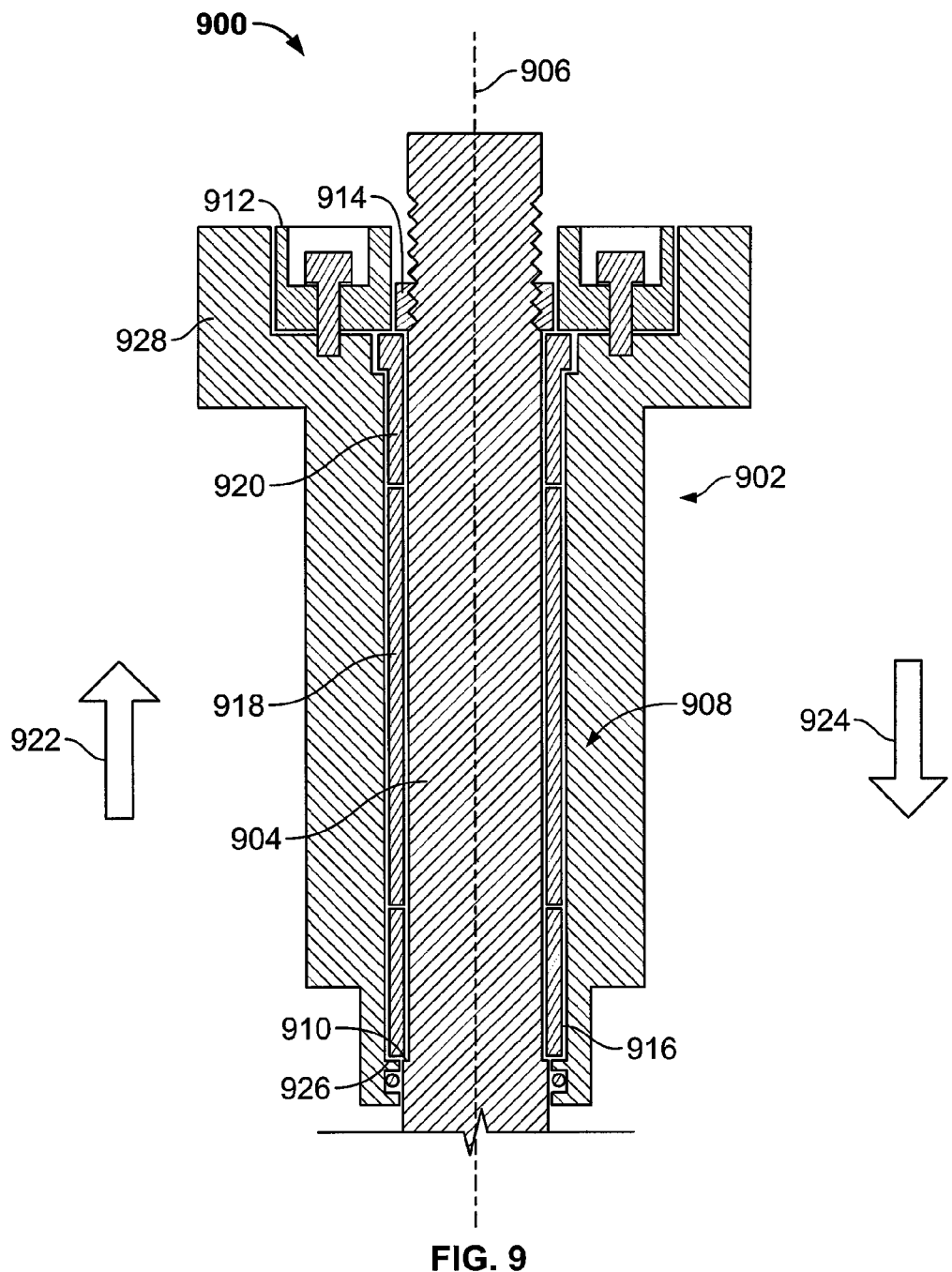

FIG. 9 depicts an alternative bonnet assembly 900 that may be removably coupled to a valve body (similar to the valve body 202 of FIG. 2) via fasteners (not shown). In contrast to the examples described above, a retaining assembly or shaft retainer 902 of FIG. 9 controls the amount of movement of a shaft 904 and/or a sealing element (similar to the sealing element 208 of FIG. 2) along a longitudinal axis 906 via an interaction between a bearing assembly 908 and a shoulder 910 of the shaft 904 and a cap (e.g., a bearing cap) 912 and a retainer 914 that threadingly engages the shaft 904.

In this example, the bearing assembly 908 includes a first bearing 916, a spacer sleeve 918 and a second bearing 920. Specifically, to substantially prevent the shaft 904 from moving along the longitudinal axis 906 in a direction generally represented by arrow 922, the shoulder 910 engages the first bearing 916, which is held in place via the spacer sleeve 918, the second bearing 920 and the cap 912. To substantially prevent the shaft 904 from moving along the longitudinal axis 906 in an opposite direction generally represented by arrow 924, the retainer 914 engages the second bearing 920, which is held in place via the spacer sleeve 918, the first bearing 916 and an inner shoulder 926 of a bonnet or support body 928. The first and second bearings 916 and 920 may be made of any suitable material such as, for example, a polyaryletheretherketone material.

Figure 10:
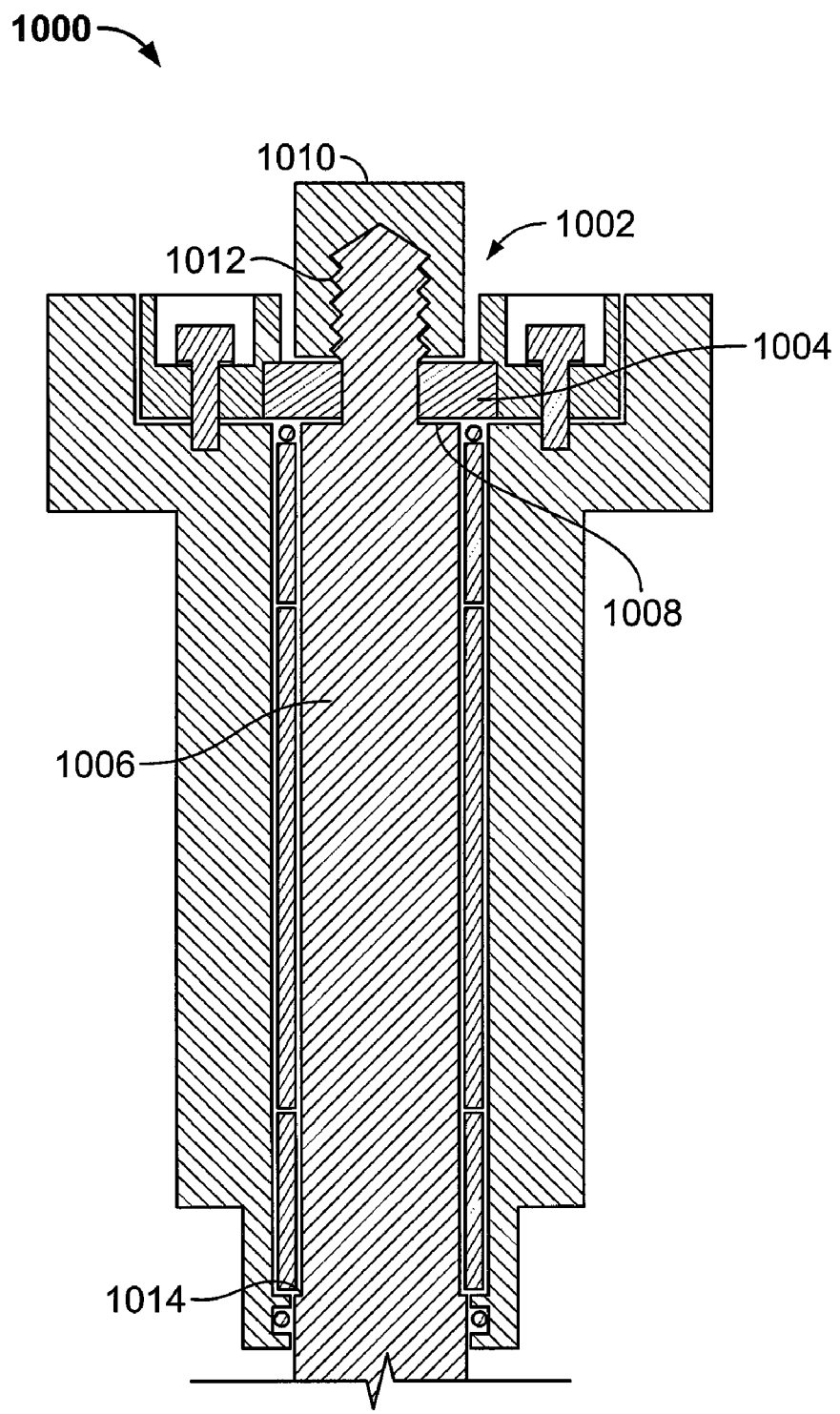

FIG. 10 depicts a bonnet assembly 1000 that includes a retaining assembly or shaft retainer 1002. Unlike the retaining assembly 238 having the retainer 242 that includes a plurality of ring segments, the retaining assembly 1002 of FIG. 10 includes a retainer 1004 that may be an annular element or a solid bearing ring. The retainer 1004 of FIG. 10 may be relatively easy to manufacture and/or to maintain manufacturing tolerances during production as compared to the retainer 242 of FIG. 2.

In practice, to couple the retainer 1004 to a shaft 1006, the retainer 1004 is positioned around the shaft 1006 adjacent a shoulder 1008 of the shaft 1006 and then a bearing retainer 1010 is threaded onto a threaded end 1012 of the shaft 1006 such that the retainer 1004 is securely positioned around the shaft 1006 between the shoulder 1008 and the bearing retainer 1010. While the shaft 1006 includes a shoulder 1014, the shaft 1006 may not include the shoulder 1014.

Figure 11:
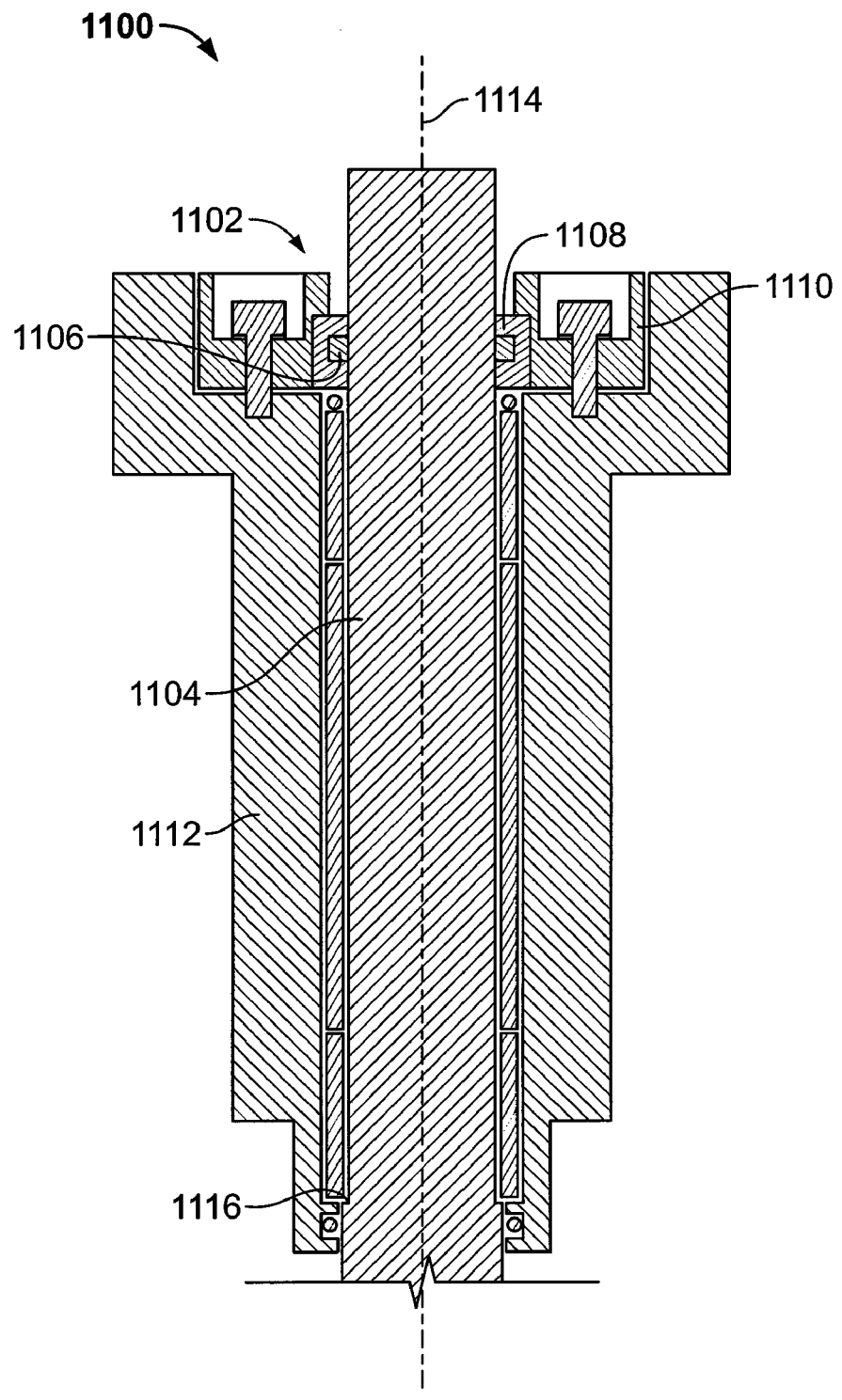

FIG. 11 depicts a bonnet assembly 1100 that includes a retaining assembly or shaft retainer 1102. Unlike the retaining assembly 238 in which the retainer 242 is positioned in the groove 244 defined by the shaft 214, a shaft 1104 of FIG. 11 includes a step, flange or tab disk 1106 that extends from the shaft 1104 and is received by a retainer or bearing (e.g., a slit ring) 1108 that at least partially surrounds the flange 1106. The retainer 1108 may be made of any suitable material such as, for example, a polyaryletheretherketone material. The flange 1106 may be an integral part of the shaft 1104 or may be coupled to the shaft 1104, for example, via a fastener (not shown). In practice, the retainer 1108 is positioned about the flange 1106, which in turn is captured between a cap 1110 and a support body or bonnet 1112 to control an amount of movement of the shaft 1104 along a longitudinal axis 1114. While the shaft 1104 includes a shoulder 1116, the shaft 1104 may not include the shoulder 1116.

Providing the shaft 1104 with the flange 1106 may enable the shaft 1104 to have a relatively smaller overall diameter while still maintaining adequate structural integrity because no material is removed from the shaft 1104 to create a groove. Additionally, such an approach may decrease the amount of time required to produce and/or manufacture the retaining assembly 238, because a groove does not have to be created on the shaft 1104 especially if the flange 1106 is coupled to the shaft 1104 via a fastener(s).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A bonnet assembly for use with a fluid valve, comprising:
    a bonnet defining a passage to receive at least a portion of a shaft of the fluid valve, wherein the bonnet is to be removably coupled to the fluid valve; and
    a retaining assembly mounted in the bonnet to be substantially not exposed to a flow of fluid through the fluid valve, the retaining assembly is to be retained in the bonnet by a cap, wherein an interaction between the retaining assembly and the cap is to provide blowout protection and to control an amount of movement of the shaft along a longitudinal axis of the shaft to enable an alignment of a sealing element coupled to an end of the shaft relative to a seating surface of the fluid valve, wherein the retaining assembly comprises a groove in the shaft and a plurality of ring segments at least partially in the groove, a portion of the plurality of ring segments extends from the groove and engages a surface in the bonnet.

2. The bonnet assembly as defined in claim 1, wherein the plurality of ring segments at least partially surround the groove in the shaft and are captured in the bonnet.

3. The bonnet assembly as defined in claim 1, wherein the retaining assembly is proximate another end of the shaft that extends from the bonnet.

4. The bonnet assembly as defined in claim 1, wherein the bonnet comprises an elongated member that defines the passage and a collar that defines a cavity to receive a portion of the cap.

5. The bonnet assembly as defined in claim 4, wherein the retaining assembly further comprises a second groove defined by the cap into which the ring segments are to be at least partially positioned.

6. The bonnet assembly as defined in claim 5, wherein the retaining assembly further comprises a shoulder of the collar to be engaged by a portion of the ring segments that extends from the groove, wherein an interaction between the ring segments, the groove, the second groove, and the shoulder is to control the amount of movement of the shaft along the longitudinal axis of the shaft to enable the alignment of the sealing element relative to the seating surface of the fluid valve.

7. A bonnet assembly for use with a fluid valve, comprising:
a bonnet defining a passage to receive at least a portion of a shaft of the fluid valve, the bonnet comprises an elongated member that defines the passage and a collar that defines a cavity to receive a portion of a cap, wherein the bonnet is to be removably coupled to the fluid valve; and
a retaining assembly mounted in the bonnet to be substantially not exposed to a flow of fluid through the fluid valve, the retaining assembly is to be retained in the bonnet by the cap, wherein an interaction between the retaining assembly and the cap is to provide blowout protection and to control an amount of movement of the shaft along a longitudinal axis of the shaft to enable an alignment of a sealing element coupled to an end of the shaft relative to a seating surface of the fluid valve, the retaining assembly comprises:
a first groove defined by the shaft around which a retainer is to be positioned; and
a second groove defined by the cap into which the retainer is to be at least partially positioned, a tapered surface surrounds the second groove to enable an alignment of the retainer relative to the second groove; and
a shoulder of the collar to be engaged by a portion of the retainer that extends from the first groove, wherein an interaction between the retainer, the first groove, the second groove, and the shoulder is to control the amount of movement of the shaft along the longitudinal axis of the shaft to enable the alignment of the sealing element relative to the seating surface of the fluid valve.

8. A bonnet assembly for use with a fluid valve, comprising:
a bonnet defining a passage to receive at least a portion of a shaft of the fluid valve, the bonnet comprises an elongated member that defines the passage and a collar that defines a cavity to receive a portion of a cap, wherein the bonnet is to be removably coupled to the fluid valve; and
a retaining assembly mounted in the bonnet to be substantially not exposed to a flow of fluid through the fluid valve, the retaining assembly is to be retained in the bonnet by the cap, wherein an interaction between the retaining assembly and the cap is to provide blowout protection and to control an amount of movement of the shaft along a longitudinal axis of the shaft to enable an alignment of a sealing element coupled to an end of the shaft relative to a seating surface of the fluid valve, the retaining assembly comprises:
a first groove defined by the shaft around which a retainer is to be positioned, wherein a thickness of the first groove is relatively larger than a thickness of the retainer and
a second groove defined by the cap into which the retainer is to be at least partially positioned; and
a shoulder of the collar to be engaged by a portion of the retainer that extends from the first groove, wherein an interaction between the retainer, the first groove, the second groove, and the shoulder is to control the amount of movement of the shaft along the longitudinal axis of the shaft to enable the alignment of the sealing element relative to the seating surface of the fluid valve.

9. The bonnet assembly as defined in claim 8, wherein the retainer comprises a plurality of ring segments.

10. The bonnet assembly as defined in claim 9, wherein the plurality of ring segments are symmetrical.

11. The bonnet assembly as defined in claim 8, wherein the second groove surrounds an aperture defined by the cap through which the shaft extends from the bonnet.

12. A fluid valve, comprising:
a valve body having a flow aperture to enable the flow of fluid therethrough;
a seal surrounding the flow aperture;
a sealing element having a shaft extending therefrom, wherein the sealing element is movable relative to the seal and the flow aperture to control the flow of fluid through the flow aperture;
a bonnet removably coupled to the valve body and having a passage to receive the shaft; and
a retaining assembly mounted in the bonnet to be substantially not exposed to a flow of fluid through the fluid valve, the retaining assembly comprises a retainer that is to extend from the shaft and engage a surface of the bonnet, wherein the retaining assembly is to provide redundant blowout protection and hold the shaft and the sealing element to enable an alignment of the sealing element relative to the valve body and the seal.

13. The fluid valve as defined in claim 12, wherein the bonnet comprises an elongated member that defines the passage and a collar that defines a cavity to receive a portion of a cap.

14. The fluid valve as defined in claim 12, wherein the retaining assembly comprises a groove in the shaft and the retainer comprises a plurality of ring segments at least partially in the groove.

15. The fluid valve as defined in claim 12, wherein the retainer comprises a plurality of ring segments that at least partially surround a groove in the shaft and are captured in the bonnet.

16. A fluid valve, comprising:
a valve body having a flow aperture to enable the flow of fluid therethrough;
a seal surrounding the flow aperture;
a sealing element having a shaft extending therefrom, wherein the sealing element is movable relative to the seal and the flow aperture to control the flow of fluid through the flow aperture;
a bonnet removably coupled to the valve body and having a passage to receive the shaft; and
a retaining assembly mounted in the bonnet to be substantially not exposed to a flow of fluid through the fluid valve, wherein the retaining assembly is to provide redundant blowout protection and hold the shaft and the sealing element to enable an alignment of the sealing element relative to the valve body and the seal, the retaining assembly comprises a groove in the shaft and a plurality of ring segments at least partially in the groove, wherein a portion of the plurality of ring segments extends from the groove and engages a surface in the bonnet.

17. A fluid valve, comprising:
a valve body having a flow aperture to enable the flow of fluid therethrough;
a seal surrounding the flow aperture;
a sealing element having a shaft extending therefrom, wherein the sealing element is movable relative to the seal and the flow aperture to control the flow of fluid through the flow aperture;

a bonnet removably coupled to the valve body and having a passage to receive the shaft; and means for providing blowout protection and controlling an amount of movement of the shaft along a longitudinal axis of the shaft to enable an alignment of the sealing element relative to the valve body and the seal, wherein the means for providing blowout protection and controlling the amount of movement of the shaft along the longitudinal axis is mounted in the bonnet to be substantially not exposed to a flow of fluid through the fluid valve, wherein the means for providing blowout protection and controlling the amount of movement of the shaft along the longitudinal axis comprises a groove in the shaft and a plurality of ring segments at least partially in the groove, a portion of the plurality of ring segments extends from the groove and engages a surface in the bonnet.

18. A rotary valve, comprising:

a valve body having a flow aperture to enable the flow of fluid therethrough;

a sealing surface surrounding the flow aperture;

a bonnet coupled to the valve body and having a passage to receive a shaft;

a shaft retainer positioned at least partially along the shaft and spaced from the flow aperture, the shaft retainer to provide redundant blowout protection, the shaft retainer comprises a groove in the shaft and a retainer at least partially in the groove, a portion of the retainer extends from the groove and engages a surface in the bonnet; and a fluid flow control member cantilevered via another end of the shaft to control a fluid flow though the flow aperture, wherein the shaft retainer substantially prevents movement of the shaft along a longitudinal axis of the shaft to align the fluid flow control member relative to the sealing surface.

19. The rotary valve as defined in claim 18, wherein the shaft retainer comprises a bearing assembly captured in the bonnet between a shoulder of the shaft and a cap coupled to the bonnet.

* * * * *